UNITED STATES PATENT OFFICE.

ROBERT EVSTAFIEFF ROSE, OF WILMINGTON, DELAWARE.

BAKING PREPARATION.

1,274,334.   Specification of Letters Patent.   Patented July 30, 1918.

No Drawing.   Application filed February 19, 1918.   Serial No. 218,157.

*To all whom it may concern:*

Be it known that I, ROBERT EVSTAFIEFF ROSE, a citizen of Great Britain, residing at Wilmington, in the county of Newcastle and State of Delaware, have invented certain new and useful Improvements in Baking Preparations, of which the following is a specification.

This invention relates to baking preparations; and it comprises as a new baking powder a mixture of sodium bicarbonate with a normal, substantially neutral calcium or magnesium salt and with a filler; such salt being advantageously calcium chlorid; all as more fully hereinafter set forth and as claimed.

Commercial baking powders are invariably mixtures of three components; sodium bicarbonate, an acid or acid-reacting body and a filler. The bicarbonate and the acid produce carbon dioxid gas, or carbonic acid, which exercises the desired leavening action as soon as the powder becomes moist in the dough. Standard powders have their ingredients so proportioned that the powder will yield about 12 per cent. of carbon dioxid. The filler which is generally starch, though milk sugar, dried milk, etc. have been used, is for the purpose of spacing apart the particles of the active components, and keeping the mixture dry. It is in the acid component that the various powders differ among themselves. Very many acids and acid bodies have been proposed but practically only three have been used to any extent, cream of tartar or acid tartrate or bitartrate of potassium (with or without more or less free tartaric acid), acid phosphate of lime, and alum, sulfate of alumina, or double sulfate of aluminum and sodium (soda alum). All three have the objection that by their action with the bicarbonate they produce bodies which are not natural components of food and which are purgative in their nature, cream of tartar giving Rochelle salts (sodium potassium tartrate), alum giving Glauber's salts (sodium sulfate) in addition to alumina and phosphate giving sodium phosphate. These residual bodies are also materials of unpleasant flavor.

I have found that great advantages are offered by the use, in lieu of these acid bodies, of various substantially neutral salts, mainly calcium salts, capable of reacting with sodium bicarbonate with liberation of carbon dioxid and formation of an insoluble carbonate. Calcium chlorid in particular gives an excellent baking powder in commixture with sodium bicarbonate and a filler; and the residues it leaves in the bread, etc. contain nothing foreign to food or of harmful properties. It imparts no unpleasant flavor and on the contrary the small proportion of salt left after its use is often desirable. In using such a powder, the first action, as the moisture of the dough reaches the powder, is the evolution of half the carbon dioxid of the sodium bicarbonate with formation of sodium chlorid, or common salt, and carbonate of calcium (carbonate of lime) with, probably, an intermediate formation of calcium bicarbonate. The calcium carbonate is of course a harmless antacid, and does no harm if it remains in the dough as such, and on the contrary is often a beneficial body. It is insoluble and has no unpleasant taste. In the event that the present leavening preparation is used in connection with yeast, this calcium carbonate is desirable as facilitating the action of the latter. In many doughs, however, it soon reacts, and especially where sour milk has been used, to form calcium lactate with further evolution of carbon dioxid. Where lactic acid is present there are really two leavening actions, a primary relatively quick evolution of gas corresponding to the action of ordinary powders, and a secondary later development of gas. The final products of action in such a case, common salt and calcium lactate, are not materials foreign to food and they have no harmful physiological action. In cases where the food material is slightly acid as happens, for example, in using molasses for making ginger bread, etc., the calcium carbonate has a desirable sweetening action, rendering unnecessary the use of sodium bicarbonate or baking soda. With such acid foods the action is the same as in the case of a sour dough. It may be noted in this connection, that the present baking powder can be used in many instances where baking soda is now used.

The amount of salt produced in the food by the use of the present baking powder is not great but it is noticeable; and to the extent the salt is formed, addition of further salt of course becomes unnecessary. Using the ordinary quantity of baking powder for bread, cake, etc., the amount of salt left is never enough to make the food too saline.

In one modification of my invention I may utilize this calcium carbonate for producing carbon dioxid and normal calcium phosphate; a body very desirable in foods. As stated, acid calcium phosphate is often used in baking powders for reaction with sodium bicarbonate. In so doing, it of course produces sodium phosphate. If however a compound baking powder be made up with calcium chlorid and some acid calcium phosphate (soluble phosphate of lime) and sodium bicarbonate (baking soda) the total action is the formation of sodium chlorid and insoluble normal calcium phosphate, (phosphate of lime) in a form which is readily available for food purposes in that it is readily dissolved by the fluids of the stomach. That is, in this form of my invention I can use acid phosphate without the production of sodium phosphate, which is an undesirable body and with the production of phosphate of lime which is a desirable body; being a normal constituent of foods and an important one.

In making a powder with calcium chlorid and sodium bicarbonate alone, I usually employ them in a ratio of about 111 parts of real calcium chlorid to 168 parts of fine dry commercial bicarbonate of soda. The dry fine ground commercial chlorid of calcium usually contains a little moisture which must be allowed for in calculating the composition. Using commercial calcium chlorid, sodium bicarbonate and a certain amount of filler I can make a powder which will produce somewhat more than the standard 12 per cent. of carbon dioxid. I usually employ about 23 per cent. of filler, mixing intimately with the other two materials and packaging in the usual way. I find starch the best filler for the present purposes. Corn starch does well. Calcium chlorid though in and of itself a highly hygroscopic material, in the present powder does not exhibit a moisture absorbing tendency to any substantial extent and the composition keeps well in the can both before opening and after opening. In making the composition it is desirable that the calcium chlorid and the starch be assembled as warm and dry as convenient.

Other calcium salts, such as sulfate, acetate, etc., may be employed in lieu of calcium chlorid; but of course do not yield common salt as a final residue of action.

Magnesium chlorid may be employed in the same way as calcium chlorid and also leaves common salt as a final residue.

In the composition described using commercial, pure calcium chlorid and sodium bicarbonate, the total residue other than sodium chlorid left is only 100 parts for each 44 parts of carbon dioxid produced, assuming the residue to be calcium carbonate; i. e., the lactic acid does not act on the calcium carbonate. If lactic acid is present, there will be somewhat more carbon dioxid produced. The usual types of powder leave much more residue; a tartrate powder, for example, leaving about twice as much residue for the same amount of carbon dioxid.

In making a compound powder with acid calcium phosphate suitable quantities for making an efficient powder are in the proportion of 100 parts commercial dry calcium chlorid reduced to a fine powder, 150 parts commercial sodium bicarbonate or baking soda and 106 parts of commercial finely powdered acid calcium phosphate. Such a powder will be of standard strength when containing as much as 26 per cent. filler. If less filler be employed, as may be, the powder will of course evolve considerably more than the standard amount of carbon dioxid.

It is often desirable to use a baking powder together with yeast or other known leavening agents; and for this purpose the present powder has the great advantage that it much stimulates the growth of the yeast organism.

What I claim is:—

1. A baking powder containing sodium bicarbonate, calcium chlorid and a filler.

2. A baking powder containing sodium bicarbonate, a filler and a neutral chlorid capable of reacting with such bicarbonate to set free carbon dioxid and form an insoluble carbonate.

3. A baking powder containing sodium bicarbonate, a filler and a substantially neutral calcium salt capable of reacting with said bicarbonate.

4. A baking powder containing sodium bicarbonate, a filler, calcium chlorid, and acid calcium phosphate.

In testimony whereof I affix my signature hereto.

ROBERT EVSTAFIEFF ROSE.